United States Patent Office 2,951,293
Patented Sept. 6, 1960

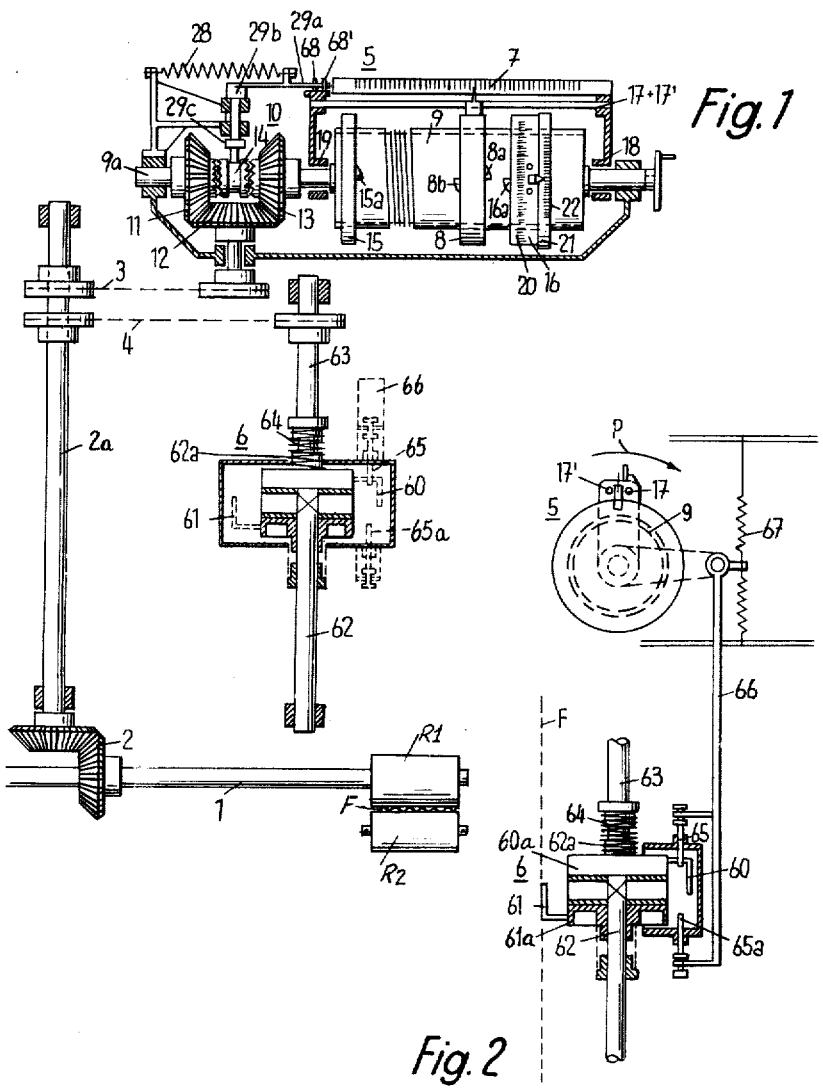

2,951,293

DEVICE FOR THE CONTINUOUS MEASURING OF CONSECUTIVE LENGTH PORTIONS OF CONTINUOUSLY TRAVELING MATERIAL

Hans Kabelitz and Wilhelm Lennartz, Gladbach, Germany, assignors to Gebrüder Sucker G.m.b.H., Gladbach, Germany, a corporation of Germany Filed Feb. 20, 1958, Ser. No. 716,497

Claims priority, application Germany Feb. 2, 1957

4 Claims. (Cl. 33—136)

Our invention relates to methods and means for continuously measuring consecutive length portions of a continuously traveling material, for example fabrics and other webs, yarn, warp and other arrays of threads.

It is known to measure given portions of length of traveling web or strip material by using the number of rotations of the material-advancing feed rollers as a measure for the length of the material being measured. This method is used, for instance, with arrays of textile threads, such as warp material, that run out of a sizing machine and are being wound onto a warp beam. Two, or any other given number of rotations of the feed rollers may correspond to one meter or yard of length. The marking of each measured length is effected by feeding the numbers of roller rotation into a counting mechanism which, when a given pre-adjusted number is reached, actuates the releasing mechanism of a marking device that then places a mark onto the web or yarn material being measured. The mechanisms heretofore used for such purposes leave much to be desired. The mechanisms either fail to measure with sufficient accuracy down to such small units as centimeters or inch fractions, or their use is limited to decimal counting or is rather complicated because of the necessity for exchanging spur gears when the device is to be adapted to different portions of length.

It is an object of our invention to eliminate these shortcomings and to provide a method and means for the continuous measuring of consecutive portions of length at greater accuracy without need for difficult or time consuming adjustments, and for ready use with any numerical system, including the decimal system as well as mixed systems such as required for measurements by yard and inch.

According to our invention, the rotational movement of the material-advancing feed rollers or of any other structure rotating in proportional relation to the traveling speed of the material being measured, is translated into a cyclical and preferably linear displacement of a measuring member which moves relative to a measuring stick or scale member at a speed likewise proportional to the traveling speed of the material so that the cyclical travel of the measuring member corresponds to an individual length portion of the material to be measured. That is, we change or reverse the traveling direction of the linearly progressing member each time the material has passed through the desired portion of length. Preferably, the measuring member, after changing its traveling direction, is caused to return along the same scale member and through the same traveling distance to the starting point, where the traveling direction of the member is again reversed so that the member will perform continuous reciprocations along one and the same length of travel. According to another feature of our invention, a marking device is actuated at each change in traveling direction of the measuring member in order to place a length-denoting mark onto the material.

According to a further feature of our invention, we provide a measuring apparatus in which the above-mentioned linearly displaceable measuring member is mounted on, and in threaded engagement with, a rotatable screw spindle so as to form a travelling nut; and we connect the spindle with the material-advancing feed roller or other driving structure through a reversing transmission which permits changing the direction of spindle rotation.

According to a more specific feature, the linear traveling motion of the measuring member along the spindle is limited by stops which are adjusted in accordance with the particular portion of length to be measured, the same stops are also effective to control the reversing operation of the driving transmission. For this purpose, the reversing transmission is actuated by a mechanism controlled by the displacing force which the measuring member imposes upon the stops when abutting against them.

According to a further feature, the same limit stops are connected with a releasing device for the marking apparatus, which as mentioned, places length-denoting marks upon the material being measured. In cases where a marking device is not required but the measured portions of length are to be counted, the above mentioned limit stops for controlling the traveling direction of the measuring member may be connected with the actuating device for a counting mechanism.

The above mentioned and other objects, advantages and features of our invention will be apparent from the embodiments of length-measuring apparatus illustrated by way of example on the accompanying drawings and described in the following. On the drawings:

Fig. 1 illustrates schematically and partly in section a device for measuring pre-determined length portions of a traveling web or warp material;

Fig. 2 shows schematically and partly in section a view from the right of Fig. 1 of some of the components of the same device.

Figure 3:
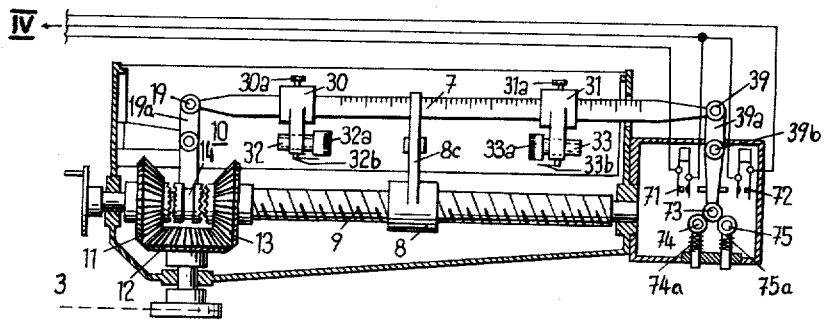
Fig. 3 shows a part-sectional view of a second embodiment of a length-measuring device.

The device illustrated in Figs. 1 and 2 is driven from a shaft 1 which is connected with one of two feed rollers R1, R2 for advancing the web or warp material F in textile-fabricating or conveying machinery, hence the rotational speed of the shaft 1 is proportional to the traveling speed of the textile material. Shaft 1 is connected by bevel gears 2 and an intermediate shaft 2a with two transmissions 3, 4, for example endless-chain transmissions, spur gears or the like, which transmit the rotational speed of shaft 1 to a measuring device 5 and to a marking device 6 respectively.

The measuring device 5 comprises a scale carrier or measuring stick 7 to cooperate with a displaceable measuring member 8. The member 8 is in threaded engagement with a revolvable screw spindle 9 and thus moves along the scale member 7 when spindle 9 is revolving. In the particular embodiment illustrated, the scale member 7 is normally stationary, while the measuring member 8 travels toward the left or right, depending upon the direction of spindle revolution. The spindle 9 is driven from transmission 3 under control by a reversing mechanism 10 that permits reversing the spindle.

The reversing mechanism 10 has three bevel gears 11, 12, 13. The two bevel gears 11 and 13 are coaxial with the spindle 9 and selectively transmit driving motion from the intermediate gear 12 to the shaft 9a of spindle 9.

The design of the reversing mechanism 10 may be such that only one of the bevel gears 11, 13 is in meshing engagement with gear 12 at a time, the gears 11 and 13 being axially displaceable on shaft 9a but not rotatable relative thereto. With such a design, the revolving direction of spindle 9 depends upon which of the two gears 11, 13 is in meshing engagement with gear 12 at a time. However, for obtaining shortest possible switching intervals, it is preferable, as illustrated in Fig. 1, to have the two bevel gears 11 and 13 freely rotatable on the spindle shaft 9a and both in continuous meshing engagement with gear 12. Consequently as long as gear 12 is being driven, the two bevel gears 11 and 13 rotate continuously in mutually opposed directions. A clutch member 14 on the shaft 9a is axially displaceable but not rotatable relative to the spindle. Displacement of clutch 14 toward the left or right causes either gear 11 or gear 13 to drive the spindle shaft in one or the other direction.

The just-mentioned reversal in spindle rotation is controlled in dependence upon the individual portions of length to be measured. This length portion can be read on the scale member 7, each scale division line denoting, for instance, one meter of material being measured. Depending upon the length portion to be measured, the device is provided with limit stops that control the reversing of clutch 14. In the embodiment of Fig. 1, the displaceable measuring member 8 has dogs 8b and 8a to abut against respective dogs 15a, 16a of two respective stop members 15 and 16. The stop members consist of nuts 15 and 16 which are in threaded engagement with the spindle 9 and can be set to any desired relative position on that spindle. That is, the nuts 15 and 16 are to be turned and then arrested at the mutual distance that corresponds to the portion of length to be measured as indicated on scale member 7. During operation of the device the two nuts 15 and 16 rotate together with the spindle 9, while the measuring member 8 is prevented from rotation by abutting against two guiding rails 17 and 17'. As a result, the measuring member 8 is displaced horizontally from the left toward the right, or vice versa. As soon as one of the dogs 8b or 8a of measuring member 8 engages the corresponding dog 15a or 16a of nut 15 or 16, the clutch 14 is separated, for instance, from gear 13 and is shifted into engagement with bevel gear 11, so that the spindle 9 reverses and shifts the measuring member 8 in the opposite direction.

The just-mentioned reversing of clutch 14 by means of the stops takes place as follows: The scale member 7 and the guiding rails 17 and 17' for measuring member 8 are rotatably mounted on spindle shaft 9a by means of pivot bearings 18 and 19. The pivotal motion is limited to a fixed angular amount by suitable stops (not illustrated). When during traveling motion of the measuring member 8 from the left toward the right, the dog 8a engages dog 16a, a torque is imposed upon the measuring member 8 by the nut 16 rotating together with the spindle. This torque causes the assembly of guiding rails 17 and 17' to pivot at bearings 18 and 19 from one limit position to the other. The pivotal motion actuates a toggle 29 which displaces the clutch 14 and then retains the clutch in the new position by means of the toggle spring 28. The toggle 29a is mounted on a shaft 29b and abuts in each limit position against one of two dog pins 68 and 68' of the rail assembly. The toggle shaft 29b carries a crank arm 29c whose crank pin engages a concentric groove of clutch 14 and shifts the clutch from gear 11 to gear 13, and vice versa, when the toggle and crank snap between the limit positions of the toggle mechanism.

Analogously, during the reversed movement of the measuring member 8, the dog 8b engages the dog 15a so that now the measuring member 8 together with guiding rails 17, 17' is rotated in the opposite direction, with the effect of causing the toggle mechanism 29 to shift the clutch 14 back to the original position.

A particular advantage of the above-described device is the fact that the stop nuts 15 and 16, or one of them, may be provided with an additional graduated scale 20 which permits calibration of the measured length portion. In this case, it is of advantage to give the clutch 14 a number of teeth whose ratio to the scale division of the micrometer scale 20 is an integer, preferably so that the number of clutch teeth is equal to the number of scale graduations. For example, if the subdivision of the scale on scale member 7 is in meters of material being measured, and if one full rotation of the stop nut 16 corresponds to the distance from one scale division to the next, then the periphery of the nut 16 may be subdivided into one hundred scale divisions in order to obtain accurate measurement in centimeters. In this case, the number of teeth of the clutch 14 is preferably likewise equal to one hundred.

It is further desirable in some cases to afford adjusting the travel reversing mechanism to different traveling speeds of the material being measured. This is because the reversing device, as well as the marking device still to be described, requires for proper operation some interval of time from the moment an operating signal issued until the operation of these devices is completed. This interval of time delay is normally constant. However, depending upon the traveling speed of the material to be measured and marked, the delay may result in some difference in the length portions being marked. For compensating such error, and according to another feature of our invention, we provide the nut 16, as is illustrated in Fig. 1, with adjusting means 21 for adaptation to different traveling speeds of the material. The adjusting means 21 are locked to spindle 9 and comprise a scale 22 indicating respectively different traveling speeds of the material, and a pointer on nut 16. The nut can be set relative to scale 22 so as to indicate the travelling speed of the material. The corresponding rotational displacement of nut 16 relative to spindle 9 has the effect that, for example, with a greater traveling speed of the material, the reversing of the mechanism 10 takes place at an earlier moment than when the material travels at lower speed.

The above described adjustable stops for limiting and reversing the linear traveling motion of the measuring member 8 also serve for releasing the marking device 6. In the illustrated embodiment, the marking device 6 is provided with two marking arms 60 and 61 which are attached to the respective hub members 60a and 61a coaxially seated on a shaft 62 or 62a. The two shafts 62, 62a are connected by a frictional slip clutch 64 with a shaft 63 driven from shaft 1 through bevel gears 2, shaft 2a and transmission 4.

The marking arms 60 and 61 are normally arrested by respective stop pins 65 and 65a. As soon as dog 8a of measuring member 8 is engaged and entrained by the dog 16a of stop nut 16 so that the guide rails 17, 17' perform the above described pivotal movement about the spindle shaft 9a in the direction of the arrow P shown in Fig. 2, a linking rod 66 shifts both stop pins 65 and 65a downwardly. Pin 65a now releases the marking arm 61. The arm 61, driven from shaft 63 through slip clutch 64, now rotates at a peripheral speed equal to the linear traveling speed of the web or warp material F. Thus the marking end of arm 61 imprints the desired length-denoting marking upon the traveling material.

Shortly before the marking arm 61 completes a full revolution, it abuts behind the other marking arm 60 which, at this time, is arrested by stop pin 65. The arm 61 thereafter remains in ready position. As soon as dog 8b of measuring member 8 is engaged and entrained by dog 15a of nut 15, the guide rails 17, 17' pivot in the opposite direction so that now the stop pin 65 is lifted and releases the marking arm 60 for rotation. When nearly completing its rotation, the marking arm 60 abuts behind the marking arm 61 which is now arrested by pin 65a.

By properly spacing the dog pins 68 and 68' (Fig. 1)

of the clutch control device, the entire system, comprising the scale member 7 and the guide rails 17, 17' as well as the linking rod 66 and the arresting pins 65, 65a, can be biased by a centering spring 67 so as to remain in mid-position when the reversing operation is completed.

If desired, only one marking arm 60 or 61 may be used. For this purpose, one or the other marking arm can be shifted relative to its carrier 60a or 61a toward the axis of its hub so that this particular marking arm no longer touches the material being measured, while the mutual arresting of the two marking arms, described above, remains effective. In this case, the portions of length marked onto the traveling material are twice as long as when both marking arms are in operation. When using two marking arms, the marking device may be given such a design that one of the marking arms, for instance arm 60, imprints onto the material F a single mark, whereas the other marking arm 61 produces a double mark, so that single and double, or one-half and full standard lengths are readily discernible on the marked material.

In the embodiment illustrated in Fig. 3, the stops for limiting the travel of the movable measuring member in accordance with the length portion to be determined are mounted on the normally stationary scale member rather than on the revolvable screw spindle. The embodiment further differs from the one described above in that the marking device is released electrically instead of by mechanical means. It should be understood that the electrical release described hereinafter is also applicable with a marking device otherwise as shown in Figs. 1 and 2, and that a mechanical release as used in the embodiment of Figs. 1, 2 may also be employed in conjunction with an embodiment otherwise corresponding to Fig. 3.

The apparatus according to Fig. 3 is provided with a movable member 8 displaceable on a linear path relative to the scale member 7. Member 8 is in threaded engagement with a rotatable screw spindle 9 which is driven through a reversing mechanism 10 with bevel gears 11, 12, 13 and a clutch 14. The bevel gear 12 is connected by a suitable transmission 3 with a roller or shaft that either forms part of a material-feeding device or is otherwise driven to rotate at a speed proportional to the traveling speed of the material being measured.

The travel of the movable measuring member 8 is limited by two stops 30 and 31 displaceably mounted on the scale member 7 and fastened in proper position by means of respective set screws 30a and 31a.

On end of scale member 7 is pivotally linked at 19 to the clutch control lever 19a of the reversing mechanism 10. The other end of member 7 is linked at 39 to a lever 39a which is fulcrumed at 39b and serves for controlling the marking device 6.

When, for example, the arm 8c of measuring member 8 abuts against the stop 31, the continuing rotation of spindle 9 causes the arm 8c to entrain the stop 31 and shift the scale member 7 toward the right so that the clutch 14 is disengaged from bevel gear 13 and enters into meshing engagement with bevel gear 11. This reverses the running direction of spindle 9 and thus also the traveling direction of the measuring member 8.

Figure 4:
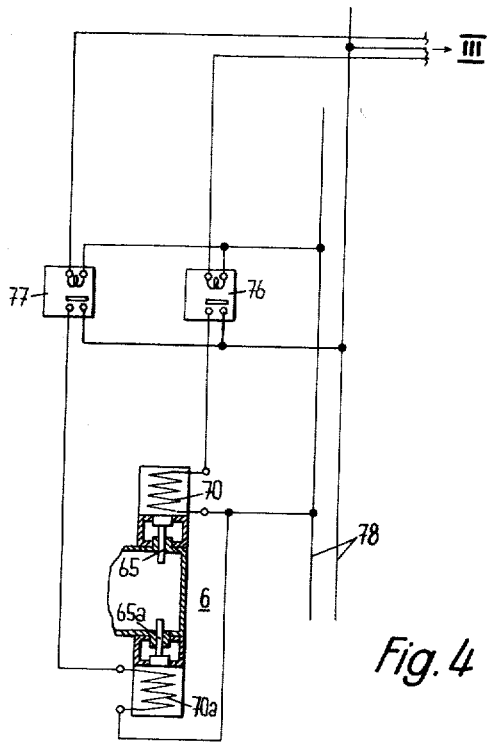
Fig. 4 is a schematic circuit diagram of a marking device according to the embodiment of Fig. 3.

The marking device 6 is released by arresting pins 65 and 65a in the same manner as described above with reference to Fig. 2. Both pins are normally in the respective positions illustrated in Fig. 4 and are pulled out of their stopping engagement with the respective marking arms 60 and 61 (Fig. 2) by the operation of respective electromagnets 70 and 70a (Fig. 4). The magnets are controlled by normally open contacts 71 and 72 respectively which are selectively temporarily closed by operation of the lever 39a. To secure accurate limit positions, the lever 39a carries a roller 73 engaged by two rollers 74 and 75 which are both journalled on respective vertically movable holders upwardly biased by respective springs 74a, 75a. The roller and spring device normally holds the lever 39a in mid-position so that the scale member 7 is also in mid-position. Obviously, the centering mechanism may also be modified so that lever 39a carries two rollers that jointly straddle a single elastically displaceable stop roller. In some cases it is also sufficient to provide the lever 39a with a single roller and to have it engaged by only one elastically displaceable counter roller or other biasing spring device.

The contacts 71 and 72 are connected with respective pulse relays 76 and 77 to whose pulse contacts the above-mentioned electromagnets 70 and 70a are connected respectively. Each pulse relay, when energized from a current supply 78 by the closing of contact 71 or 72, issues a temporary pulse to the magnet 70 or 70a so that the energizing circuit of the magnet is again interrupted before the marking arm 60 or 61 can perform a second, undesired, rotation. However, the relays 76 and 77 may also consist of ordinary contact relays, and the temporary excitation of the magnets 70, 70a can then be obtained merely by the operation of the rollers 73, 74, 75 or other biasing means which place the lever 39a into mid-position immediately after the spindle 9 is reversed, so that both contacts 71 and 72 are again open and both electromagnets 70 and 70a are deenergized before the then active marking arm 60 or 61 has completed a single rotation.

As in the embodiment of Figs. 1, 2, the apparatus according to Fig. 3 may be provided with additional micrometer scales. For this purpose, the stops 30 and 31 are provided with respective screws 32 and 33 whose axes are substantially parallel to the axis of the spindle 9. The heads of screws 32 and 33 are provided with calibrating scales 32a and 33a, respectively, indicating the angular degree of rotation. Hence, the spacing of the screw heads from the main bodies of respective stops 30 and 31 can be read on the micrometer scales in co-operation with stationary markers 32b and 33b on the respective stops. In this case, the screw 33 with scale 33a, for example, may be used for calibrating the desired length portion with an accuracy down to centimeters or millimeters; whereas the screw 32 with scale 32a may serve for adjusting the travel reversing mechanism 10 in the above described manner, to different traveling speeds of the material being measured.

The invention permits of various modifications other than those specifically set forth herein. For example, instead of actuating the reversing device for the screw spindle with the aid of a mechanical clutch, any other suitable reversing devices, such as electromagnetic reversing clutches, may be used instead. It will be obvious to those skilled in the art, upon a study of this disclosure that such and other modifications are available without departing from the essential features of our invention and within the scope of the claims annexed hereto.

We claim:

1. Apparatus for continuously measuring a succession of predetermined length portions of travelling material, comprising structure continuously and unidirectionally rotating in proportion to the travel of the material, an elongated scale carrier having length-denoting indicia, a revolvable screw spindle parallel to said carrier, a measuring member in threaded engagement with said spindle and linearly displaceable in indicating relation to said indicia due to revolution of said spindle, two stops at the respective ends of the travel path of said member, at least one of said stops being adjustable as to its spacing from the other stop in accordance with a desired length of said portions of material, a reversible transmission between said spindle and said structure for driving said spindle and member in proportion to the travel of the material, first control means actuable by said stops and connected with said transmission for controlling said transmission to reverse the travel direction of said member each time said member abuts against one of said respective stops, a normally inactive marking device engageable with the material to provide it with a length-denoting mark, and second control means actuable by said stops and connected with said marking device for actuating said marking device when said member reverses its travel direction.

2. A length-measuring apparatus according to claim 1 comprising spring means connected with said scale carrier and biasing it to a normal position, said scale carrier being capable of limited displacement from said normal position due to force transmitted from said member by said respective stops onto said carrier when said member engages said respective stops, and said first and second control means being connected with said carrier so as to be actuated by said carrier displacement.

3. Apparatus for continuously measuring a succession of predetermined length portions of travelling material, comprising structure continuously and unidirectionally rotating in proportion to the travel of the material, an elongated scale carrier having length-denoting indicia, a revolvable screw spindle parallel to said carrier, a measuring member in threaded engagement with said spindle and linearly displaceable in indicating relation to said indicia due to revolution of said spindle, two stops mounted on said spindle to rotate in fixed relation thereto, said stops being engageable by said member at the respective ends of linear travel of said member, one of said stops being rotatably adjustable relative to said spindle to set a desired spacing between said two stops in accordance with the desired length of said portions of material, a reversible transmission between said spindle and said structure for driving said spindle and member in proportion to the travel of the material, and reversing control means connected between said stops and said transmission for controlling said transmission to reverse the travel direction of said member each time it reaches said respective stops, said scale carrier being pivoted about the axis of said spindle, spring means connected with said scale carrier and biasing it to a normal position, said carrier being capable of pivotal movement away from said normal position due to force transmitted from said member by said respective stops onto said carrier when said member engages said respective stops, and said control means being connected to said carrier so as to be actuated by said pivotal movement.

4. An apparatus for continuously measuring a succession of predetermined length portions of travelling material, comprising structure continuously and unidirectionally rotating in proportion to the travel of the material, an elongated scale carrier having a scale of length-denoting indicia, a revolvable screw spindle parallel to said carrier, a measuring member in threaded engagement with said spindle and linearly displaceable in indicating relation to said indicia due to revolution of said spindle, two stops mounted and normally fixed on said scale carrier, at least one of said stops being adjustable along said scale to a desired spacing from the other stop, a reversible transmission between said spindle and said structure for driving said spindle and member in proportion to the travel of the material, reversing control means connected between said stops and said transmission for controlling said transmission to reverse the travel direction of said member each time it reaches said respective stops, said carrier being longitudinally displaceable in parallel relation to said spindle, and elastic biasing means connected with said carrier for holding it in a normal position, whereby said carrier is longitudinally displaced from said normal position when said respective stops are engaged by said member, said control means being connected to said carrier so as to be actuated by said longitudinal displacement.

References Cited in the file of this patent
UNITED STATES PATENTS

| | | |
|---|---|---|
| 1,371,373 | Hughes | Mar. 15, 1921 |
| 2,763,064 | Bandy | Sept. 18, 1956 |

UNITED STATES PATENT OFFICE

CERTIFICATION OF CORRECTION

Patent No. 2,951,293                                September 6, 1960

Hans Kabelitz et al.

It is hereby certified that error appears in the above numbered patent requiring correction and that the said Letters Patent should read as corrected below.

In the heading to the printed specification, line 9 should appear as shown below instead of as in the patent:

Claims priority, application Germany Feb. 20, 1957

Signed and sealed this 25th day of April 1961.

(SEAL)
Attest:

ERNEST W. SWIDER
Attesting Officer

DAVID L. LADD
Commissioner of Patents